April 3, 1951     W. JOSEPHIAN     2,547,823
REGULATOR SYSTEM
Filed May 10, 1944     2 Sheets-Sheet 1

INVENTOR.
WILLIAM JOSEPHIAN
BY
Lippincott & Metcalf
ATTORNEYS

Patented Apr. 3, 1951

2,547,823

UNITED STATES PATENT OFFICE 2,547,823

REGULATOR SYSTEM

William Josephian, Oakland, Calif.

Application May 10, 1944, Serial No. 534,965

2 Claims. (Cl. 137—78)

My invention relates to regulators and more particularly to a regulator system for controlling the dispensing of liquid or gas under pressure from tanks.

Many processes utilize a gas or liquid dispensed from a tank under pressure, and in accordance with conventional practice, the attention of an operator is required in switching over from a tank approaching exhaustion to a fully charged one in order to avoid interruptions.

Among the objects of my invention are:

1. To provide a novel and improved apparatus and system for automatically switching into operation a fully charged tank or group of tanks upon exhaustion of one or a group already in use, to assure continued uninterrupted flow of a gas or liquid when necessary;

2. To provide a novel and improved system for automatically switching into operation a fully charged group of tanks in response to a reduction in pressure of tanks in use, to a point indicative of exhaustion of such tanks.

Additional objects of my invention will be brought out in the following description of a preferred embodiment of the same, taken in conjunction with the accompanying drawings, wherein—

Figure 1:
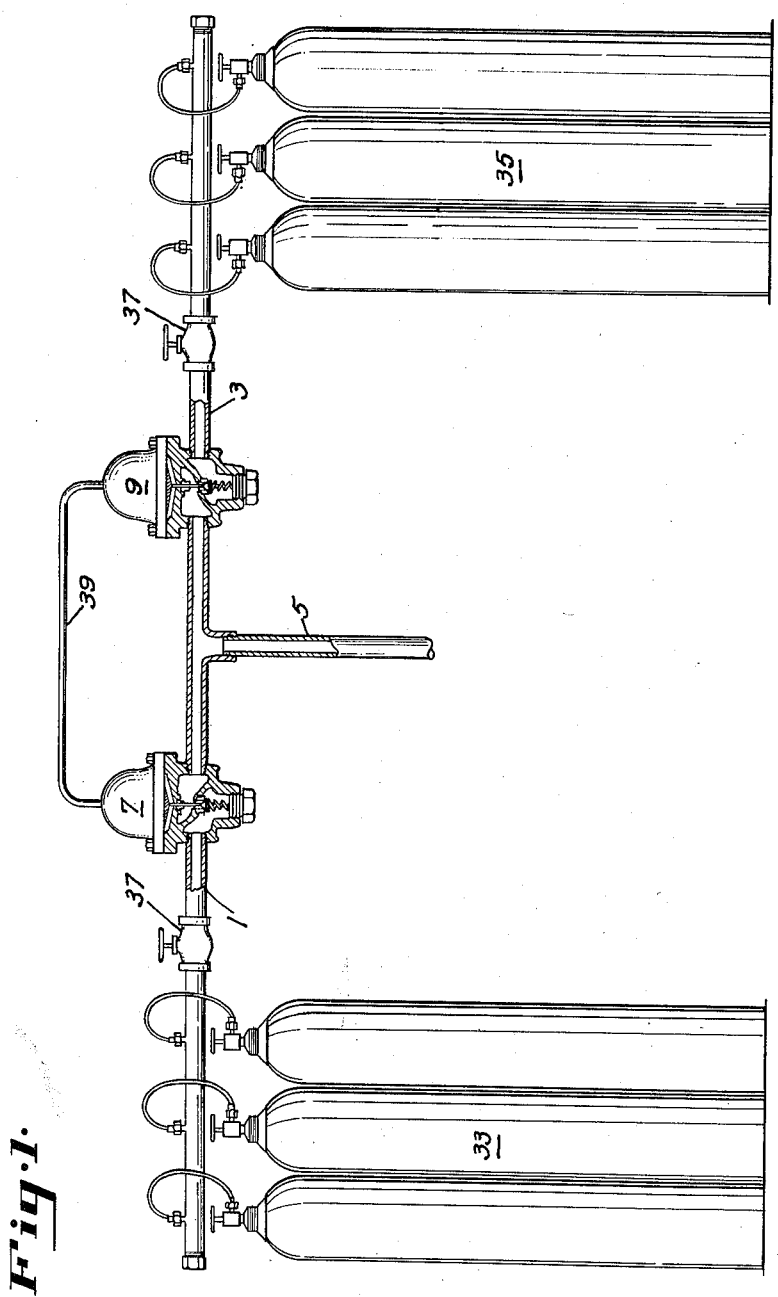
Figure 1 is a view partly in section illustrating an apparatus and system set up in accordance with the teachings of my invention.
Figure 2:
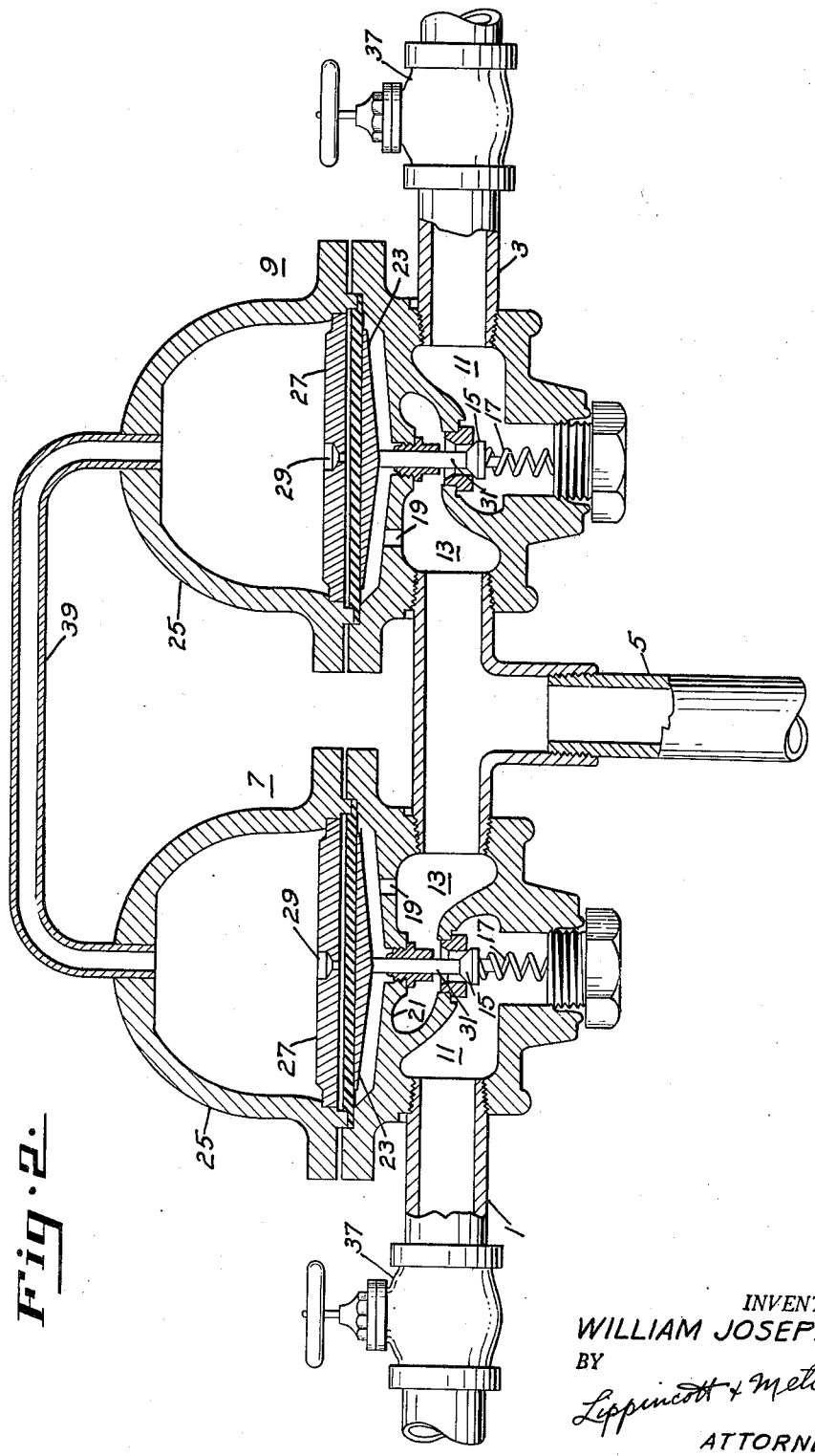
Figure 2 is a magnified view of a portion of the system of Figure 1.

Referring to the drawings, the system comprises a pair of high pressure lines 1, 3, each connecting to a common low pressure line 5 through a pressure reducing regulator 7, 9, respectively.

For illustrative purposes only, I have depicted the individual regulator as being of the type known as the "Grove" pressure reducing regulator. Such regulator provides a high pressure inlet passage 11 and a low pressure discharge passage 13 separated by a valve 15 exposed to both the closing effect of the gas or liquid on the high pressure side and a spring 17.

The pressure on the discharge side 13 is permitted to back up through an opening 19 in a partition 21 to exert a corresponding pressure over the undersurface of a diaphragm 23, which closes off a dome 25 filled with gas under pressure, of a value approximating that desired in the low pressure line 5. A dome plate 27 supported above the diaphragm 23 in slightly spaced relationship thereto is provided with a central orifice 29 which regulates the application of the gas pressure within the dome, thereby controlling the diaphragm movement. The slightest movement of the diaphragm creates large pressure changes in the actuating chamber below the orifice.

The valve 15 is provided with a valve stem 31 connecting to the diaphragm 23, whereby downward excursions of the diaphragm will be transmitted to the valve, causing the same to open to a degree in accordance with the extent of such movement of the diaphragm.

In the operation of the regulator, the extent of movement of the diaphragm 23 will vary in accordance with the differential pressure existing thereon. Such differential pressure being the difference between the pressure exerted by the gas in the dome 25 against the upper surface of the diaphragm and the combined pressure against the under side of the diaphragm due to the gas or liquid on the low pressure side of the valve 15, the closing pressure exerted against the valve by the gas or liquid on the high pressure side, and the biasing spring 17. When the total pressure against the under side of the diaphragm exceeds that on the upper surface, the valve will be seated, thereby closing off the low pressure discharge passage 13 from the high pressure inlet passage 11.

When the pressure on the discharge side drops sufficiently low to reduce the total pressure on the under surface of the diaphragm to a value below that exerted on the upper surface of the diaphragm, the valve 15 will be forced open to an extent depending upon the magnitude of such difference, thereby releasing corresponding amounts of gas or liquid from the high pressure inlet passage through the valve to the discharge side.

In this manner a pressure on the discharge side will be maintained at a value approximating that existing in the dome 25. Such pressure will be maintained without substantial variation until the high pressure supply approaches exhaustion and is incapable of supplying the requirements necessary to maintain the pressure on the discharge side of the regulator.

When a pair of such regulators are employed in a system as illustrated and described, they cooperate in response to a difference in pressure in the high pressure lines 1 and 3 to block off the supply of gas or liquid from that high pressure source having the higher pressure. Such blocking will automatically be maintained until the high pressure source having the lower pressure value approaches exhaustion, following which the blocked-off source will automatically be cut in, without interruption to the supply of gas or liquid at the low pressure in the common low pressure line.

In the system illustrated, the supply sources are represented by groups of tanks 33 and 35, the group 33 being considered at a lower pressure than the group 35. In explanation of the operation of this system, it is pointed out that under this condition, the total pressure opposing the opening of the valve in regulator 9 will exceed the total pressure opposing the opening of the valve in the other regulator 7 due to the difference in the pressures existing in the high pressure lines 1 and 3. Therefore, with the same dome pressure in each regulator, the regulator associated with the high pressure line of lower pressure value, namely the high pressure line 1 in this instance, is bound to open first to supply the low pressure line 5. When this occurs, the pressure of the gas on the low pressure side of the regulator 7 will be transmitted through the discharge passage of the other regulator 9 to the under surface of the diaphragm of such regulator, thereby increasing the pressure opposing the opening of the valve of this regulator. Consequently, the low pressure line 5 will be supplied exclusively from the high pressure source 33 until such source approaches exhaustion.

When this condition is reached, the pressure on the discharge side of the regulator 7 can no longer be maintained by the source 33 and will accordingly decline in value. Such pressure as exists against the under surface of the diaphragm of the other regulator 9 will likewise decline in value, and will ultimately reach a point where the dome pressure against the upper surface of the diaphragm will exceed the total pressure exerted against the under surface thereof and bring about an opening of the valve, thereby automatically cutting in the fresh source of supply 35. Such automatic change-over will be indicated to an operator by any suitable pressure-indicating instrument connected in the high pressure line.

Following such switch-over, the exhausted supply may be then replaced by a fresh supply and whichever of the two supplies happens to be of the higher pressure value, such supply will be held in readiness for a subsequent cut-in, while the supply of lower pressure value is consumed.

A manually controlled shut-off valve 37 in each of the high pressure lines 1 and 3 enables the supply tanks to be disconnected or added to the system at will.

In the operation of my improved regulating system, maximum efficiency is realized when the dome pressures of the regulators 7 and 9 are equal. To assure this condition, I interconnect the domes of these regulators with a connecting tube 39 whereby such pressures will be equalized at all times.

While I have disclosed a system involving but two high pressure lines feeding a common low pressure supply line, it is apparent that any number of high pressure lines may be incorporated in this system, each supplying the gas or liquid through a regulator, with the domes of all the regulators preferably interconnected to assure equalized pressures therein.

Although the preferred embodiment of my invention has been disclosed in detail, it becomes apparent that the same may be subject to alteration and modification without departing from the underlying principles thereof, and I accordingly do not desire to be limited in my protection, except as may be necessitated by the appended claims.

I claim:

1. A regulator system comprising a plurality of independently supplied high pressure lines, each connected to a common low pressure line through regulators each including a valve biased to closed position substantially entirely by a force due to the pressure of the source with which the particular regulator is associated, such valve closing forces being substantially equal when the pressure of said sources is equal, fluid pressure loading means in said regulators biasing said valves toward open position and providing equality in opening force when the loading pressures on such valves are equal, and means for effecting equalization of said loading pressures.

2. A regulator system comprising a plurality of independently supplied high pressure lines, each connected to a common low pressure line through regulators each including a valve biased to closed position substantially entirely by a force due to the pressure of the source with which the particular regulator is associated, such valve closing forces being substantially equal when the pressure of said sources is equal, fluid pressure loading means in said regulators biasing said valves toward open position and providing equality in opening force when the loading pressures on such valves are equal, said fluid pressure loading means comprising a gas chamber with gas under pressure therein, and means for effecting equalization of said loading pressures, said means comprising a communicating passage between said chambers.

WILLIAM JOSEPHIAN.

REFERENCES CITED

The following references are of record in the file of this patent:

UNITED STATES PATENTS

| Number | Name | Date |
|---|---|---|
| 518,513 | Rueff | Apr. 17, 1894 |
| 1,304,754 | Ellis | May 27, 1919 |
| 2,176,580 | Buttner | Oct. 17, 1939 |
| 2,202,313 | Grove | May 28, 1940 |
| 2,270,304 | Jacobson | Jan. 20, 1942 |
| 2,306,382 | Fink | Dec. 29, 1942 |
| 2,320,886 | Quiroz | June 1, 1943 |
| 2,329,363 | Thomas | Sept. 14, 1943 |